United States Patent
Smith

(10) Patent No.: US 8,338,749 B2
(45) Date of Patent: Dec. 25, 2012

(54) POWER BOOSTER FOR METAL DISINTEGRATOR

(75) Inventor: Douglas E. Smith, LaGrange, OH (US)

(73) Assignee: Cammann, Inc., Birmingham, OH (US)

( * ) Notice: Subject to any disclaimer, the term of this patent is extended or adjusted under 35 U.S.C. 154(b) by 349 days.

(21) Appl. No.: 12/851,568

(22) Filed: Aug. 6, 2010

(65) Prior Publication Data

US 2012/0031885 A1 Feb. 9, 2012

(51) Int. Cl.
*B23K 9/10* (2006.01)
(52) U.S. Cl. ............ 219/130.31; 219/130.21; 219/130.1
(58) Field of Classification Search ............. 219/130.31, 219/130.21, 130.1
See application file for complete search history.

(56) References Cited

U.S. PATENT DOCUMENTS

| 3,949,185 A |   | 4/1976 | Roach |
|---|---|---|---|
| 3,963,893 A |   | 6/1976 | Roach |
| 4,259,562 A |   | 3/1981 | Cammann et al. |
| 4,476,368 A |   | 10/1984 | Cammann et al. |
| 4,584,452 A | * | 4/1986 | Zafred .......................... 219/69.2 |

\* cited by examiner

*Primary Examiner* — Huan Hoang
(74) *Attorney, Agent, or Firm* — Pearne & Gordon LLP

(57) ABSTRACT

A high power disintegrator system comprising a master disintegrator unit and a power booster disintegrator unit, the units being connectable in parallel to a common electrode, each unit including a cutting transformer and an adjustable auto transformer arranged to supply an adjustable voltage to its cutting transformer, an electrical control circuit responsive to voltage detected in the power booster unit that prevents operation of the booster unit when the auto transformers are set to produce different voltages at their respective cutting transformer.

6 Claims, 3 Drawing Sheets

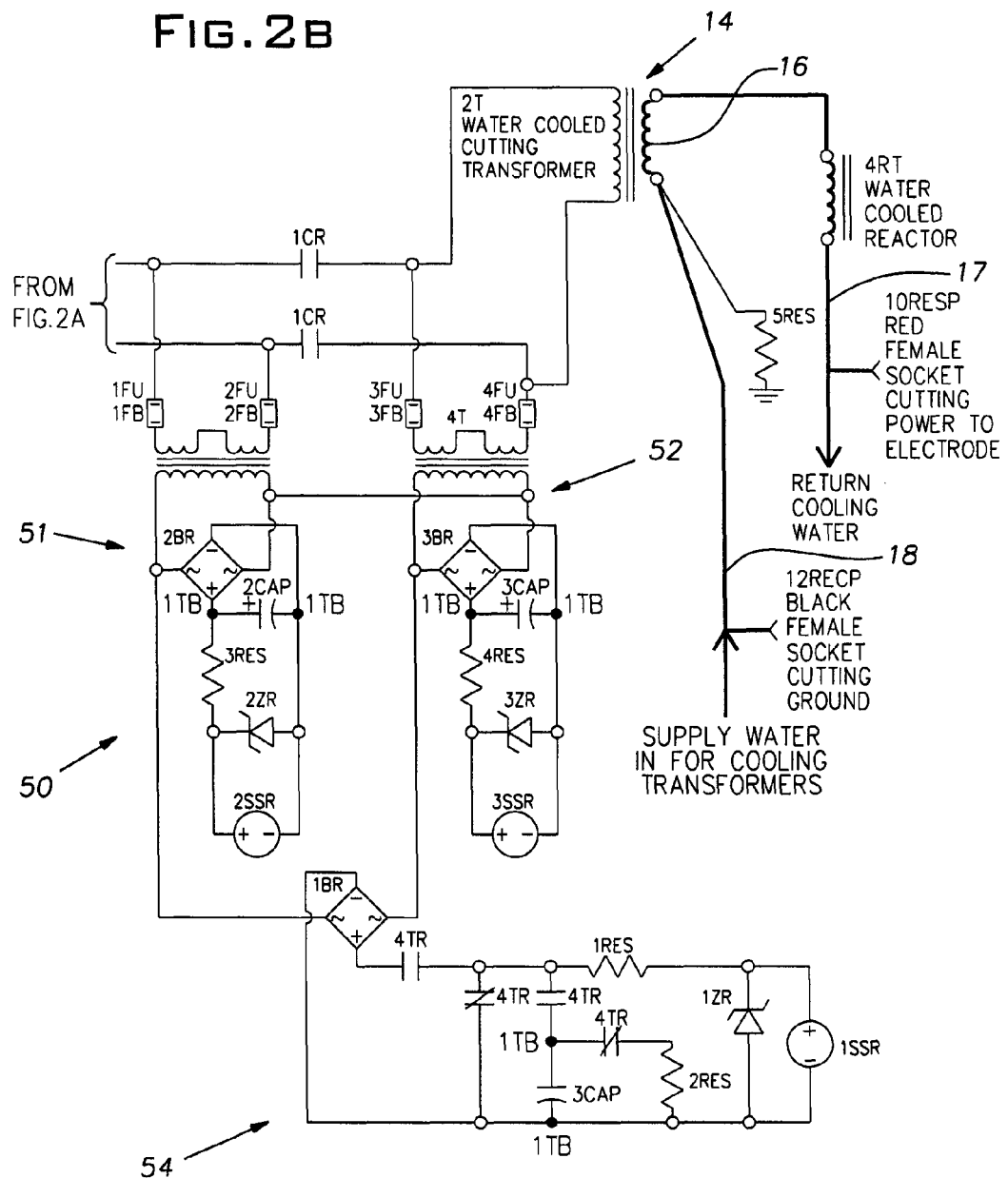

US 8,338,749 B2

POWER BOOSTER FOR METAL DISINTEGRATOR

BACKGROUND OF THE INVENTION

The invention relates to devices that use an electric arc struck between a metal object and an electrode to disintegrate the metal object.

PRIOR ART

Electric arc disintegrators are useful in the removal of broken tools, broken and/or corrosion locked bolts and removal of spent or physically obstructing metal components. The rate of metal removal and the cross-sectional area of the material being removed is limited by the power capacity of the disintegrator. As technology progresses, there is a need for increased power capacity over that developed by commercially available units. One obstacle in simply increasing the size of existing designs is that a large $I^2R$ heating loss occurs in the cutting transformer. Dissipation of this heat already can tax the materials and construction of existing transformer arrangements to their practical limits.

Simply connecting two disintegrators in parallel for operation of a single, common electrode is problematic because different settings on their respective auto transformers and/or connections to different phases of a power supply can cause back feed into a disintegrator unit that results in damage or destruction of a unit.

The electrical power required for a particular job is related to the cross-sectional area of the electrode and the part being disintegrated. These factors will, of course, vary considerably in the applications in which the disintegrator equipment is used. To account for this variation, a disintegrator unit, as is conventional, uses a multi-tapped auto transformer to drive a water cooled cutting transformer. Where, as contemplated by the invention, two disintegrator units are to be used in parallel, it is imperative that the tap settings, and therefore the output voltages be the same so that one unit does not back feed destructive current or voltage levels to the other unit. For the same reasons, each unit must be supplied by the same phase of a three phase supply.

SUMMARY OF THE INVENTION

The invention provides a system in which two separate disintegrator units can be safely connected in parallel to energize a common electrode. The disclosed system comprises a master disintegrator unit and a booster disintegrator unit incorporating special safety circuitry. The circuitry automatically checks that the settings of the auto transformer of each unit is the same and that the connections made to each unit from an electrical power source is on the same phase.

The ability to reliably use two disintegrator units in parallel offers many benefits as compared, for example, to a single larger unit. The total heat loss in the cutting transformer and related componentry is cut in half. Identical componentry can be used in both units thereby simplifying inventory, production, and diagnostics. Some of the components, including the cooling water circulating pump, heat exchanger, and control power supply, can be shared between the units. The units can be individually moved through passageways and into confined spaces separately where a single larger unit could not fit. Where a job has a low power requirement, only one disintegrator unit need be transported to and used at the worksite.

BRIEF DESCRIPTION OF THE DRAWINGS

FIGS. 2A and 2B, combined, show an electrical circuit diagram of the booster unit.

DESCRIPTION OF THE PREFERRED EMBODIMENT

Figure 1:
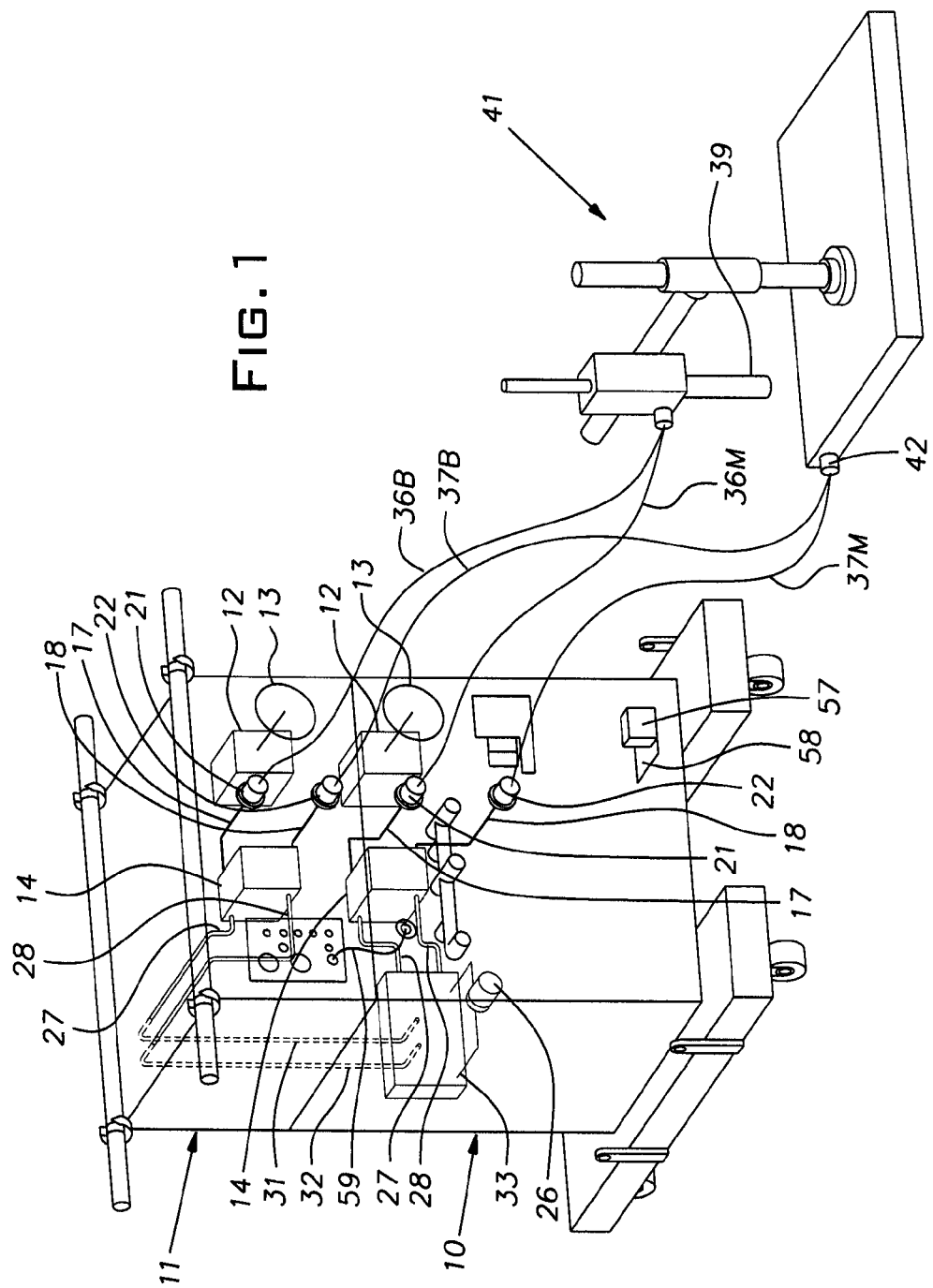
FIG. 1 is a diagrammatic representation of a master disintegrator unit, a power booster disintegrator unit, and an electrode positioner.

Referring now to FIG. 1, a master or host disintegrator unit 10 and a power booster disintegrator unit 11 are shown. The units 10, 11 comprise separate metal cabinets in each of which are mounted electrical and electronic components (hereafter each referred to as electrical components). Electrical components discussed below in the units 10, 11 that are identical are identified by the same numerals. Multi-tap auto-transformers 12 are each manually set by rotating a knob 13 on the front of the respective unit 10, 11. The auto-transformers 12 drive their respective cutting transformers 14 such that a cutting transformer will develop, for example, 3 to 30 volts in 8 steps or settings of an auto-transformer. Secondary windings 16 of the cutting transformers 14 as well as lines 17, 18 connecting the winding to output and ground terminals or sockets 21, 22 can comprise double wall copper tubing for supply and return of water coolant.

An electrically operated pump 26, located in the master unit 10 forces coolant water through the cutting transformer secondary windings 16 and lines 17, 18 through supply and return lines 27, 28 within the master unit 10 and through hoses 31, 32 connected between the units 10, 11 at their rear faces. Water circulated through the cutting transformers 14 by the pump 26 passes through a heat exchanger 33 that transfers heat to utility water passing through the heat exchanger.

Figure 2A:
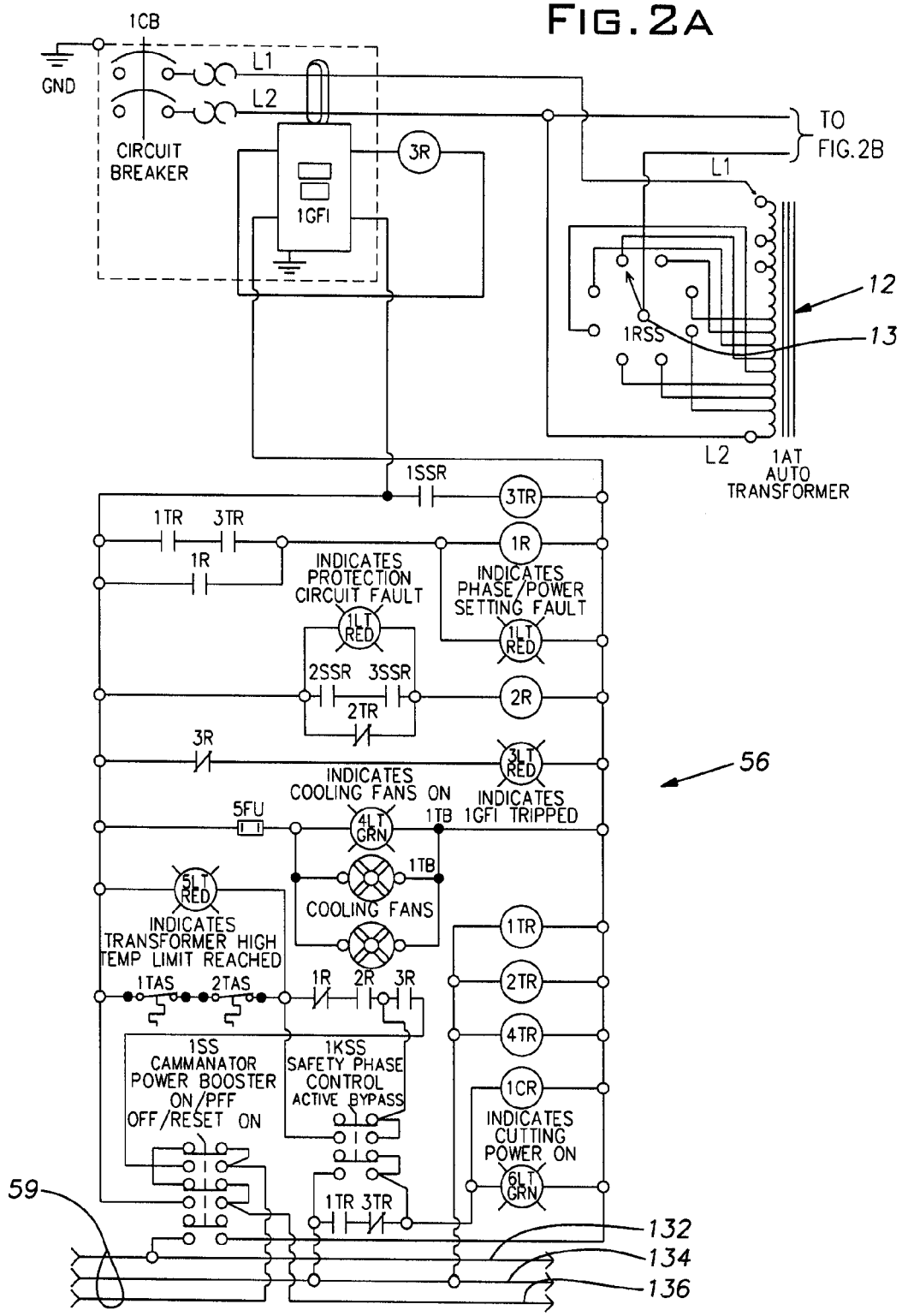

FIG. 2 shows the electrical connections between the auto-transformer 12 and the cutting transformer 14. The secondary coil of the auto-transformer 12 is connected across the cutting transformer primary coil. Relay contacts 1CR, discussed below, in the lines connecting these transformers 12, 14 in the power booster unit 11 are not present in the wiring between the corresponding auto-transformer and cutting transformer in the master unit 10. The output socket 21 and ground socket 22 are located on the front of respective master and power booster cabinets.

The master unit 10 and power booster unit 11 are used together such as when a job requires a high power consuming electrode and/or when a fast cut is desired. In such a high power mode, the high side terminals 21 of both units are connected together, i.e. operate in parallel, through cables 36. Similarly, the ground terminals 22 are connected together. The cables from the high side sockets or terminals 21 are connected together at a common connector 38 at an electrode 39. Typically, the electrode 39 is carried on an electrode positioner 41 (FIG. 1) generally known in the art. Grounding cables 37 from the ground terminals 22 are connected together at a grounding connector 42 on a base of the positioner 41 or otherwise disposed to ground a workpiece. A line 17 between the master unit cutting transformer and its high output socket 21 can have a sensing transformer (not shown) to monitor current through the cutting transformer. A reactor 4RT in the line 17 between the power booster cutting transformer 14 and the output socket 21 serves to match the impedance of the current sensing transformer in the line 17 between the master unit cutting transformer 14 and the output socket 21. The wiring between the auto-transformer 12 and the cutting transformer 14 in the master unit 10 is essentially the same as that in the power booster unit 11 shown in FIG. 2 with the exception that, as previously mentioned, there are no relay contacts equivalent to the contacts 1CR.

The control circuit shown in FIG. 2 serves to verify that the auto-transformer settings on the main and power booster units 10 and 11 are the same and that both of these units are connected to the same phase of power supplied by a utility or local generator before the power booster unit cutting transformer is energized through the contacts 1CR. If these settings and phase connections are not identical, there is a risk that when the two disintegrator units are used in parallel that one can develop a destructive voltage in the other. Initially, the open contacts 1CR of a control relay 1CR disconnect the power booster auto-transformer 12 from the associated cutting transformer 14.

When the master unit 10 is first turned on, its cutting transformer will back feed its voltage through its cables 36M, 37M, and the power booster unit cables 36B, 37B to the power booster unit cutting transformer 14. This master unit voltage will be multiplied by transformer action in the primary winding of the power booster unit cutting transformer. During this start up time, the lines out of each auto transformer will carry a voltage corresponding to the settings selected by the machine operator at the knob 13. Since the auto transformer 12 and cutting transformer 14 of the master and power booster units are functionally and preferably physically the same, the voltage induced by the master unit in the primary of the power booster cutting transformer 14 will be the same and of the same phase as that existing in the secondary of the booster auto transformer 12 provided that the auto transformer settings of the units are the same and the supply power to each of these units is connected to the same phase. In the context of the circuit of FIG. 2, the voltage on both sides of both of the open contacts of 1CR (interrupting the lines between the auto and cutting transformers of the power booster) will be the same if the auto transformer settings and phase connections at both units are correct, i.e. the same.

During start up of the power booster unit 11, the voltage across the lines from the power booster auto transformer 12 on the proximal side of the contacts 1CR and the voltage in these lines on the distal side of the contacts being back fed from the master unit and multiplied by the power booster cutting transformer 14 is monitored by a protection circuit 50. The protection circuit 50 has two sides 51, 52, one sensing the power booster auto transformer voltage, the other sensitive to the back fed voltage. Each circuit side 51, 52 has a transformer 3T, 4T that proportionately reduces the AC voltage to a range between 6 and 40 volts. The reduced voltage is rectified in a bridge 2BR, 3BR. The rectified voltage is applied to a solid state relay 2SSR, 3SSR. A failure of either or both of the protection circuit relays 2SSR, 3SSR to be excited indicates a malfunction in the respective circuit side and through relay logic embodied in the circuit of FIG. 2 causes the master and power booster units 10 and 11 to shut down.

A differential circuit 54 includes a bridge rectifier 1BR having each of its input terminals individually connected to the secondary of one of the protection circuit transformers 3T, 4T. The output of the rectifier 1BR is applied to a solid state relay 1SSR. Contacts 1SSR of this relay 1SSR are shown in the top rung of a ladder control circuit 56. The control circuit 56 receives 120 volt AC power through lines 34 and 32 shown at the bottom of FIG. 2A. This 120 volt control voltage on the lines 134, 132 is provided by a power supply indicated at 57 in FIG. 1 through an external cable 59 connected to the power supply through a control circuit 58 in the master unit 10. A third line 136 in the cable 59 is connected to a part of the master unit control circuit 58 such that if the continuity of this line is interrupted in the power booster ladder control circuit 56, the master unit 10 is shut off.

Control relays 1R, 2R in the ladder control circuit 56 and 3R associated with a ground fault interrupter 1GFI monitoring for leakage current in the power supply lines to the power booster unit 11 have contacts in a serial line that is inserted in between parts of the line 136 when an on-off switch 1SS of the power booster 10 is switched on. Relay 1R latches on to shut off the master unit 10 when the differential circuit 54 detects a voltage difference between what the power booster auto-transformer 12 is delivering to the lines to the cutting transformer 14 on one side of the contacts 1CR and what is produced on these lines on the other side of the contacts from the back fed signal from the master unit 10. Relay 2R (initially temporarily energized by 2TR) de-energizes if either or both relays 2SSR, 3SSR in the protection circuit 50 fail to remain energized thus signaling a failure of its or their respective side 51, 52 of the protection circuit 50. In this event, relay contacts 2R open and shut off the master unit 10 by interrupting continuity in the line 136.

The relay 3R associated with the GFI monitors incoming power at the power booster unit and trips off when a fault is detected, opening its normally open contacts 3R, thereby interrupting the continuity of line 136 and shutting down the master unit 10.

A supplemental explanation of the function of certain electrical or electronic components of the power booster unit electrical circuit is given below.

| | |
|---|---|
| 1GFI | Deenergizes 3R which deenergizes 1CR, if a leakage currently exceeds more than 7 ma from either L1 or L2 through ground reference resistor 4RES. Can be tested and reset with buttons at 1GFI |
| 1R | Latches up during a differential fault. This shuts the master power unit off and keeps it off until control circuit is reset. 1 LT lights under this condition. |
| 2R | Energizes when 3T and 4T along with 2BR and 3BR are supplying DC voltage to 2SSR and 3SSR. After 1 second 2TR will open. If there is a fault in either DC supply, 2R will deenergize opening control circuit of master power unit. 2 LT will flash. This circuit is provided to not let the master power unit run if the protection circuit in the slave unit is not functioning properly. |
| 3R | Pilot relay opens when 1GFI senses a ground fault on incoming service line to machine, opens control circuit and energizes 3 LT. |
| 1TR | Set at 300 milliseconds. It delays the start up of 1CR to check fault circuitry. |
| 2TR | Set at 2 seconds. Energizes 2R for 1 second by bypassing 2SSR and 3SSR, which verifies DC sources from 3T and 4T are functioning |
| 3TR | Set at a minimum of 100 milliseconds. Energizes through 1SSR, if a voltage difference is sensed between 3T and 4T. 3TR compensates for time lag in all the relays. Keeps 1R from latching up when the stop button is pushed. |
| 4TR | Set at a minimum of 100 milliseconds. It applies DC voltage from differential circuit to 1SSR when master power unit is energized. It also keeps 1 cap from discharging through 1SSR when master power unit is on, and differential |

| | |
|---|---|
| | voltage is zero. This circuit is necessary to allow a faster start up time through 1TR, especially on higher tap settings. When 4TR deenergizes, 1 cap discharges through 2RES. |
| 1CR | Energizes 250 milliseconds after master power unit is energized. If no differential faults are sensed and 3TR remains closed 1CR and 6LT will energize from 1CR circuit on master power unit and 2LT cutting transformer will be energized. |

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited. It is envisioned, for example, that verifying electrical circuitry ascertaining that the auto-transformer setting of two self-contained master disintegrator units are at the same setting and that the same phase of electrical power source is being supplied to both units before they are enabled to operate in parallel can be provided in accordance with the present invention.

What is claimed is:

1. A high power disintegrator system comprising a master disintegrator unit and a power booster disintegrator unit, the units being connectable in parallel to a common electrode, each unit including a cutting transformer and an adjustable auto transformer arranged to supply an adjustable voltage to its cutting transformer, an electrical control circuit responsive to voltage detected in the power booster unit that prevents operation of the booster unit when the auto transformers are set to produce different voltages at their respective cutting transformer.

2. A high power disintegrator system as set forth in claim 1, wherein said control circuit is arranged to prevent operation of the power booster unit when different phases of a power source are connected to said master unit and said power booster unit.

3. A high power disintegrator system as set forth in claim 1, wherein said master unit includes a water pump and heat exchanger for circulating cooling water through the cutting transformers of both of said disintegrator units.

4. A high power disintegrator system as set forth in claim 1, wherein control circuitry in the power booster unit is powered by a power supply in said master unit.

5. An electrical circuit for use with a pair of electrical arc disintegrators to be connected in parallel for electrically powering a common electrode and each having an adjustable auto transformer driving a cutting transformer with an adjustable voltage, the circuit having an electrical detector for verifying that the voltage setting of the auto transformer of each of the disintegrators is the same, and electrical control elements preventing one of the disintegrators from starting up of cutting power when the settings are different.

6. A method of operating a pair of disintegrators each having an adjustable auto transformer driving a cutting transformer to power a common electrode comprising connecting the output of each cutting transformer in parallel to a common electrode, confirming with an electrical circuit that the auto transformer voltage setting of one of the units is the same as the other unit by comparing the voltage available at the output of the auto transformer of the one unit with the voltage developed by back feeding the voltage from the cutting transformer of the other unit increased by induction through the cutting transformer of the one unit, and preventing operation of the one unit where the compared voltages are significantly different.

* * * * *